350-332 SR

XR 3,898,646

1 X 5104N

United State

Washizuka et al.

[11] 3,898,646

[45] Aug. 5, 1975

[54] LIQUID CRYSTAL DYNAMIC DRIVE CIRCUIT

[75] Inventors: Isamu Washizuka, Kyoto; Saburo Katsui, Nara, both of Japan

[73] Assignee: Sharp Kabushiki Kaisha, Osaka, Japan

[22] Filed: Nov. 21, 1973

[21] Appl. No.: 418,043

[30] Foreign Application Priority Data

Nov. 22, 1972 Japan .............................. 47-117554

[52] U.S. Cl. ............................ 340/336; 350/160 LC

[51] Int. Cl. ............................................ G08b 5/36

[58] Field of Search ........... 340/324 M, 336, 324 R; 350/160 LC

[56] References Cited

UNITED STATES PATENTS 3,679,933 7/1972 Nakada et al. ............... 315/169 TV 3,786,486 1/1974 Torresi ............................... 340/336

*Primary Examiner*—David L. Trafton

*Attorney, Agent, or Firm*—Stewart and Kolasch, Ltd.

[57] ABSTRACT

To display in a dynamic fashion multi-digit numeral information stored in a register by means of liquid crystal display units having response delay characteristics, the numeral information in the register is first introduced digit by digit into a buffer register the one-digit contents of which then are supplied to the multi-digit liquid crystal units each subsequent display unit period. Inhibition of display during each introduction period is achieved by a application of alternate voltage having a high frequency sufficient to turn the liquid crystal units to a non-turbulence state. Preferrably the contents of the register circulating at a rate considerrably higher than the response frequency provide inhibitation signals for the liquid crystal units.

9 Claims, 10 Drawing Figures

3898646
OR IN 340/336

LIQUID CRYSTAL DYNAMIC DRIVE CIRCUIT

BACKGROUND OF THE INVENTION

This invention relates to a liquid crystal drive circuit and more particulary to a display circuit using liquid crystal display units of the properties that the response is slow and the state thereof is turned to a non-turbulence state by application of alternate voltage of high frequency.

Nematic liquid crystals are described in US Pat. No. 3,449,112 issued on Mar. 3, 1970 by George H. Heilmeier and Louis A. Zanomi. Such crystal has a layer of a nematic liquid crystal composition of a type that scatters light due to a turbulence in the layer created by the application of a voltage across the layer. However, the recovery time of the liquid crystal, after it is excited, may be relatively long, and the bidirectional characteristic may be found (that is, the liquid crystals may be activated by a electric field without regard to the polarity thereof. There are serious disadvantages in application to optical display for various electronic equipments.

The object of this invention is to provide an improved liquid crystal drive circuit when is capable of effectively driving liquid crystal units, care being taken of the foregoing disadvantages.

SUMMARY OF THE INVENTION

This invention is for liquid crystal display units each having a common electrode, a plurality of segment electrodes and a liquid crystal composition interposed between the both electrodes. In accordance with teachings of this invention the liquid crystal display unit is temporarily in a non-turbulance by application of an alternating voltage with sufficiently high frequency in a dynamic fashion.

DETAILED DESCRIPTION

Before discussing a circuit system in greater detail, it may be of advantage to illustrate a conventional display system with reference to FIGS. 1 through 4 inclusive.

Figure 1:
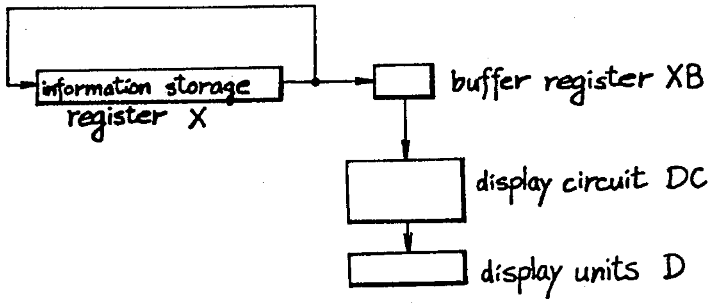
FIG. 1 is a schematic showing of a conventional information display system.
Figure 2:
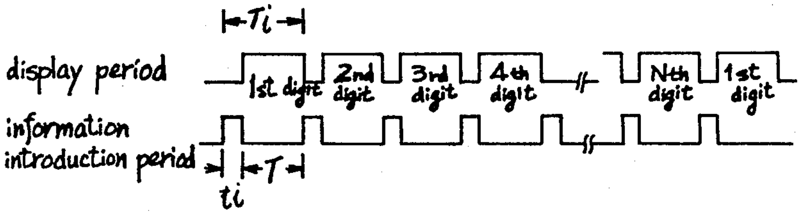
FIG. 2 is a drawing showing time relation of the information in the display system of FIG. 1.

In FIGS. 1 and 2 showing the conventional concept of information display system, a sequence of display control is achieved by repetition of display unit periods Ti and information introduction periods ti. That is, information is successively read out digit by digit from an information storage register X, and a buffer register XB stores such information only during the display unit period and provides the outpits thereof for a display circuit DC. After a lapse of the display unit period the information at the succeeding digit place is introduced into and stored in the buffer register XB.

Unless a special treatment is carried out, the contents in the buffer register XB which transitionally change during the information introduction period will be unexpectedly displayed, because the contents of the buffer register are supplied via the display circuit including a decoder or driver to display units B.

Therefore, one of the following approaches to avoid the above-mentioned disadvantages is required in practical use.

1. During the information introduction period no signals are supplied to the display units D.
2. The display unit period Ti is chosen considerably longer than the information introduction period ti so as to minimize substantially an extraordinary display.

Figure 3:
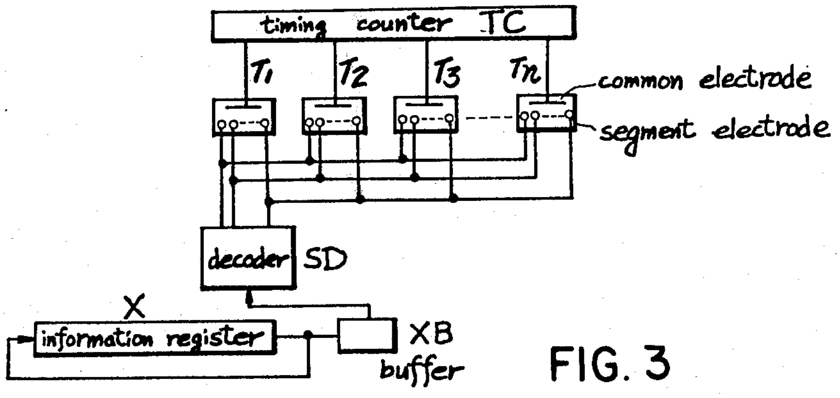
FIG. 3 is a drawing showing of a conventional dynamic fashion display system.

This invention is to realize the approach 1. in application to the liquid crystal display system and to the dynamic mode display system shown in FIG. 3 wherein logical AND established by signals to the common electrode and segment electrodes serves to perform selection of display.

Figure 4:
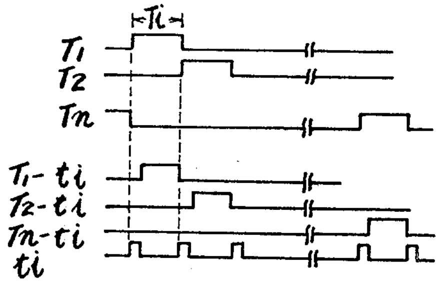
FIG. 4 is a time chart in the system of FIG. 3.

With reference to FIG. 4, a showing of relation between outputs from a timing counter TC of FIG. 3 and signals indicative of the information introduction period *ti*, the timing counter T*c* generates sequentially digit selection time signals corresponding in the display unit time T*i*, while the information register itself circulates in synchronization with digit selection time signals.

In case of discharge indication tubes (trademark NIXIE) the special treatment during the information introduction period may be accomplished as follows. As shown in FIG. 4, the pulse width of the outputs from the timing counter is chosen T*i*-*ti* and the voltage across the anode and cathode is held at such a low level that the tube emits light during a period of time *ti*. Alternatively, signals to the segment electrode are held at a high level so that the tube is not luminous even when high level signals are impressed on the common electrode.

In applying the former method to the liquid crystal display panel, the potential at the segment electrode may increase to the high level though the common electrode is held at the low level. Hence, the former method is not suitable for the liquid crystal due to the fact that there is no directivity in potential between the both electrodes. More particularly, the known discharge tubes such as NIXIE can not be turned on when the potential at the common electrode is below that at the segment electrode, whereas in the liquid crystal the turbulence phenomenon will occur in such case.

On the other hand, the latter method is effective only during the selection time and non-selection time. This is due to the reason that the potential at the segment electrode is more positive than that at the common electrode and thus the liquid crystal unit fails to prevent the turbulence. Needless to say, although it is desirable to apply an identical potential to both the common electrode and the segment electrodes, control circuits are required for both the electrodes for doing this.

This invention is useful for avoiding the undesirable conditions and, in accordance with teachings of this invention, the common electrode is held at about an intermediate level of signals to segment electrodes during the information introduction period and the segment electrodes accept an alternating voltage of such frequency that the liquid crystal therebetween is not permitted to change to the non-turbulence state at the same timc. Such special treatment only for the common electrode is sufficient to prevent changes to turbulence state during the information introduction period. Now, referring to FIGS. 1 and 2, one embodiment of this invention will be described in detail.

As previously explained, liquid crystal units D1-Dn of n digits have respectively one common electrodes A1-An and a plurality of segment electrodes K1-Kn which are connected in common for all of the display units. The common electrodes A1-An accept time-sharing signals T10-Tno while the individual groups of the commonly connected segment electrodes K1-Kn accept segment selection signals S10-Sno. It is assumed in this example that the liquid crystals are at the non-turbulence state when the potential of 6V is applied thereto and at the turbulence state when the potential of 12V is applied.

The signals T10-Tno to the common electrodes are of the intermediate level during the non-selection period and the alternating level of ± 12V during the selection period. One complete cycle of these signals T10-Tno corresponds to the pulse width Ti-*ti* described with reference to FIG. 2 and is included within one of the display unit periods.

Meanwhile, the segment signals S10-Sno have two levels indicative of information, two components of the same phase and opposite phase as the signals T10-Tno during the selection period. In other words, the selection period for the segment electrodes is dominated by the signals having the phase which after by 180° from that of the time sharing signals T10-Tno during the common electrode selection period whereas the non-selection period therefor is dominated by the segment signals of the same phase as the counterparts.

Under these circumstances, the alternating voltage of ±18V to permit to arrive at the liquid crystal when the selection period for the common electrodes is coincident with that for the segment electrodes. Alternatively, the alternating voltage across the liquid crystal units is ±6V when the common electrode is at the selection state and the segment electrode is at the non-selection state and is ±6V, when the common electrode is at the non-selection state and the segment electrode is at any one of the selection state of the non-selection state. The result is the latter cases is a change of the liquid crystal to the non-turbulence state.

As noted earlier, it is of importance for this invention that the signals applied to the common electrodes for the information introduction period, namely, the signals having time period ti represented by $\alpha_1$ or $\alpha_2$ are maintained at the intermediate level or OV, while the information with ± 6V transiently introduced into the buffer circuit XB is substituted for the segment signals and applied to the liquid crystal units D without modifying their shape, time period and so on. In addition, it should be appreciated from the foregoing that the information frequency occurring during the information introduction period in which the information is shifted to the buffer circuit XB is previously chosen to have the value effective to turn the liquid crystal to the non-turbulence state. It is obvious that the segment signals are necessarily of high frequency components irrespective of the contents of the information since they are processed as phase-controlled signals described later. Moreover, the degree of change to the non-turbulence state may be much incremented since the liquid crystal receives the alternating voltage of ±6V even for the information introduction period. Unless such treatment is carried out, the liquid crystal exhibits an extraordinary turbulence during the information introduction period in response to application of pulses of an amplitude 12V.

Figure 5:
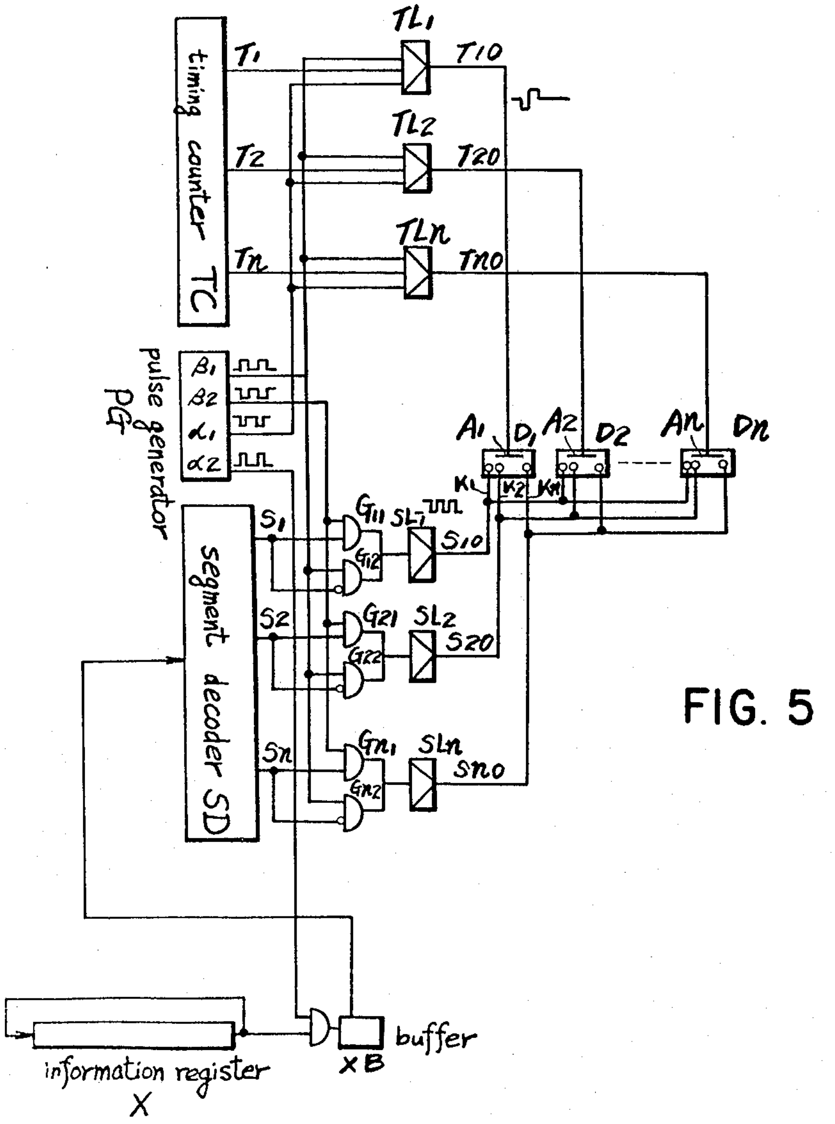
FIG. 5 is a schematic showing of an embodiment in accordance with teachings of this invention.
Figure 6:
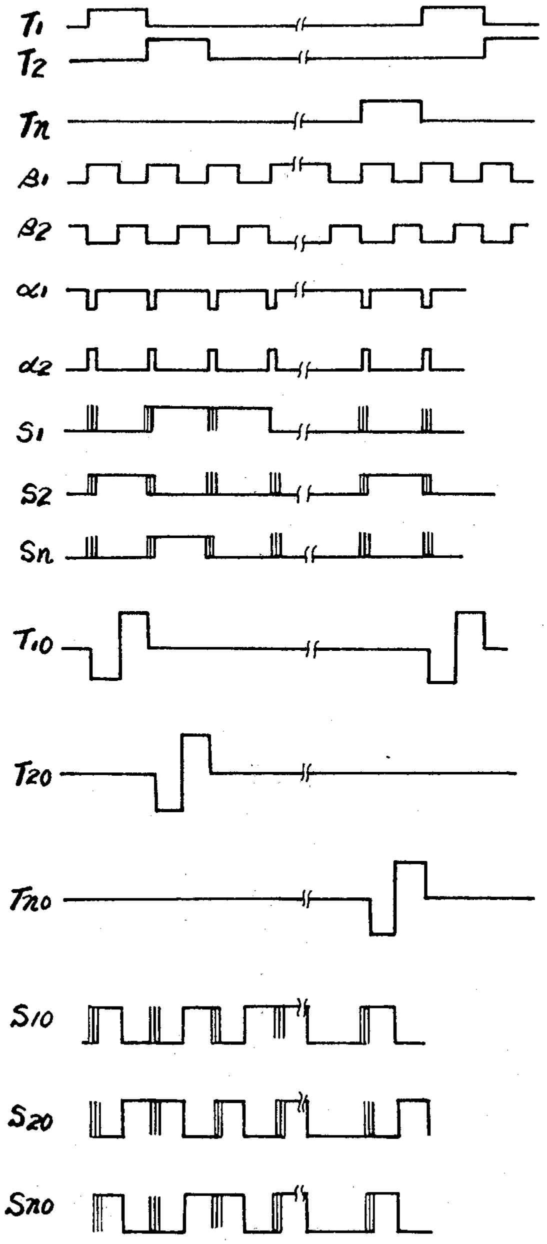
FIG. 6 is a time chart showing various signals which occur in the circuit of FIG. 5.

A way of obtaining the signals T10-Tno and S10-Sno shown in FIG. 6 will be described with reference to FIG. 5.

In this drawing, the information register X stores the information of *n* digits therein and the information of one-digit is entered into a buffer register XB of a one-digit capacity during a period of the output $\alpha_2$ from a pulse generator PG. Since the signals entered into the buffer register XB are in a binary code decimal notation, they should be converted into signals corresponding to the individual segments formed therein via a segment decoder SD.

The levels of the segment signals S1-S*n* thus obtained are still voltage levels and accordingly should be converted into phase-controlled signals through AND gates, for example, AND gates G11, G12 in case of the segment signal S1.

Signals $\beta_1$ from the pulse generator PG are passed to the output terminal by the AND gate G12 at the segment selection state, while another signals $\beta_2$ differing in phase by 180° from the first-named signals $\beta_1$ are gated to the input terminal by the other AND gate G11 at the non-selection state.

The foregoing circuit arrangement which may be incorporated into one or more IC's by means of MOS-FET's, will develop voltages not suitable for driving the liquid crystal units. For this reason, a level converter circuit such as SL1 is arranged and constructed to generate pulses of ± 6V as the S10 SIO thereof. However, where the output voltages from the MOS-IC are approximately ± 6V, the converter circuit SL1 may be omitted. In the illustrated example the inputs and outputs of the converter circuit SL1 are correlated in the same phase.

Although the voltage of ±6V is sufficient as the alternating voltage to the common electrode, that of ± 12V is much more effective for purpose of applying a higher voltage to the liquid crystal when both the common and segment electrodes are selected at the same time and of turning the liquid crystal to the non-turbulence state when the common electrode is selected and the segment electrode is not selected. In this manner the voltage of ± 18V is applied to the liquid crystal when both the common and segment electrodes are selected and the voltage of ±6V is applied thereto when only the common electrode is selected.

The signals to be supplied to the common electrodes are associated with the timing signals and obtained from the output of the signal converter circuits TL1-TLn which accept the outputs of the timing counter TC. In addition, such obtained signals to the common electrodes are held at the intermediate level, viz. OV only for the information transmission period.

Figure 7:
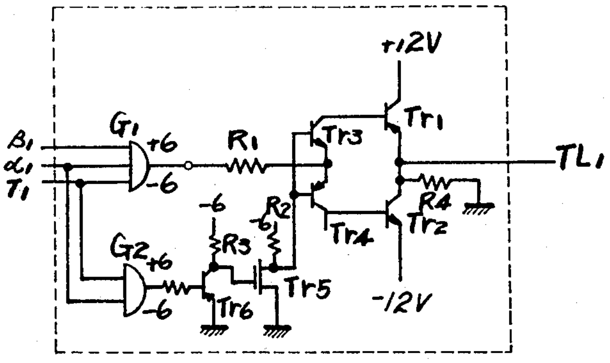
FIG. 7 is a circuit diagram showing a signal converter circuit.

For example, the common electrode selection signals T1O to the liquid crystal unit Dl are obtained from the signal converter circuit T1, the circuit construction of which is illustrated in FIG. 7. The signal converter circuit TL1, receives as inputs the timing signals T1, the signals $\beta_1$ having the pulse width identical with the display unit period and a cycle within the timing signals T1, and the inversion signal $\alpha_1$ representative of the information introduction period.

A PNP transistor Tr1 and a NPN transistor Tr2 are arranged in a complementary construction wherein their collectors are connected together and their emitters are connected to +12V and −12U respectively. To control the base current through these transistors, the base of the transistor Tr1 is connected to the collector of a NPN transistor Tr3 and the equivalent of the transistor Tr2 to the collector of a PNP transistor Tr4. The input signals arrive at commonly connected emitters of the additional transistors Tr3, Tr4 through a resistor R1.

The additional transistors Tr3, Tr4 have their commonly connected bases which in turn are connected together to the drain of a MOS type transistor Tr5 having its source grounded, its gate connected to the output of a PNP transistor type inverter Tr6, and a load resistor R2 tied to −6V.

With such an arrangement, the transistors Tr1, Tr2 are controlled by the additional transistors Tr3, Tr4 in the following manner: When the transistors Tr1, Tr2 are OFF, the intermediate level, OV develops across the output of the converter construction via a resistor R4. The output voltage is + 12V when the transistors Tr1, Tr2 are ON and OFF respectively and contrarily −12V when the transistors Tr1, Tr2 are OFF and ON respectively.

The transistors Tr3, Tr4 serve as emitter followers with an emitter resistor R1 when the transistor Tr5 is ON and their bases receive the voltage OV. Provided that the input voltage levels + 6V, −6V is unchanged, the emitter current through the resistor R1 will be constant. It follows that the base current through the transistors Tr1, Tr2 is stabilized.

When the bases of the additional transistors Tr3, Tr4 are held at OV, such circuit arrangement has the function of an amplitude converter circuit. That is, when the input level is +6V the transistors Tr2, Tr4 become ON and the negative voltage of −12V develops across the output TL1. Conversely, when the input level is −6V the transistors Tr1, Tr3 are turned ON, the voltage of +12V appears across the output TL1.

In this instance the base current through the transistors Tr1, Tr2 is stabilized in a manner previously described. This results in advantages that the base current may be limited within a stable range in the case where an impedance load such as the liquid crystal is coupled to the output terminal TL1, and in addition the base current may be adjusted merely by the resistor R1 when it is desired to alter the amplitude by choice of the common emitter resistor R1.

The MOS type transistor Tr5 is useful for holding the output TL1 at the intermediate level or OV, together with the gates G1, G2. Change of the transistors Tr3, Tr4 to their OFF states is required to do so and such requirement is satisfied by equalizing the input voltage level with the voltages at the bases of the transistors Tr2, Tr4, for example, −6V under these conditions. These conditions are established for a combination of the common electrode non-selection period and the information introduction period, designated by a logical product $T1 \cdot \alpha_1$. The gates G1, G2, therefore, include the logical condition $T1 \cdot \alpha_1$. The gates G1, G2 provide their outputs of −6V when being OFF and the outputs of +6V when being ON. The transistor Tr6 is ON and then the output of the transistor Tr5 is −6V at all times except the logical condition $T1 \cdot \alpha_1$.

Figure 8:
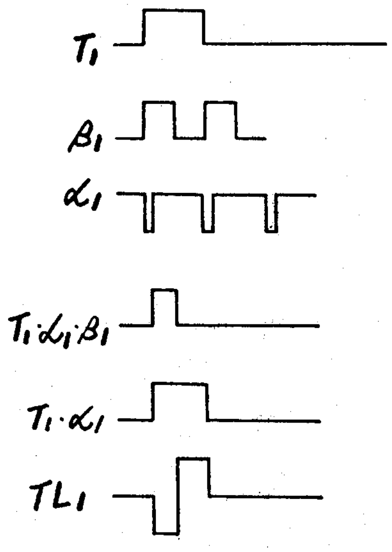
FIG. 8 is a time chart associated with the converter circuit of FIG. 7.

The gate G1 further accepts as inputs the signals $\beta_2$ which are subjected to amplitude conversion. Under the conditions $T1 \cdot \alpha_1$ wherein the transistor Tr5 is ON and the transistor Tr6 is OFF, the transistor Tr2 is ON and the output TL1 is −12V if the gate G1 output is +6V, and the transistor Tr1 is turned ON and the output TL1 is + 12V if the output from the gate G1 is −6V. FIG. 8 reveals such time relation.

In such a manner, when the common electrode and the segment electrodes are both selected, the signals applied thereto are different in pulses by 180° so that the potential between the two electrodes of the liquid crystal becomes the maximum value ± 18V. In accordance with teachings of this invention, the frequency of the signals $\beta_1$, $\beta_2$ associated with the common electrodes is so chosen that the liquid crystal is at the turbulence state as long as the sufficient amplitude of the alternating voltage is held.

Figure 9:
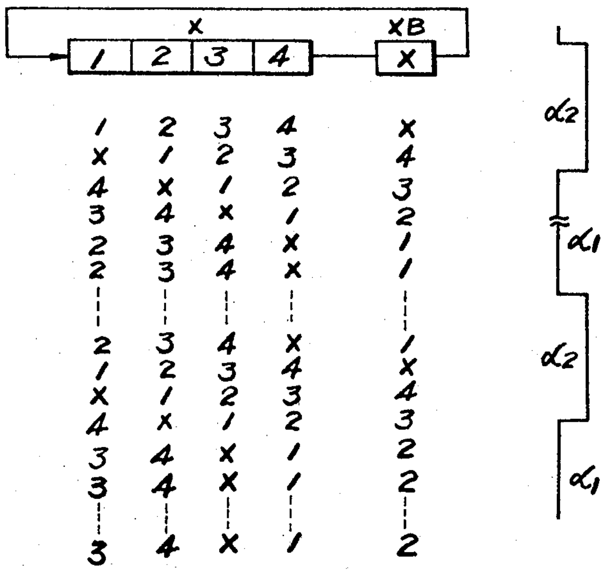
FIG. 9 is a drawing showing one way of introducing signals into a register.

On the other hand, the information introduction period is required to transmit the information from the information storage register to the buffer register and, viewing from the same position, the information changes each one bit time period in case of the recirculating shift register. By performing left shift operations as a means for shifting the contents of the information register to the buffer register, one-digit information is sequentially led out from the register in the significance descending order each lapse of one word time period associated with the information register. FIG. 9 illustrates the relative positions of one-digit information in the shift performances.

The shift treatments are carried out during the period of the signals $\alpha_2$ and the contents of the buffer register XB are displayed during the period $\alpha_1$. As discussed above, the shift treatments are performed on the time scale of one-bit of the information.

Figure 10:
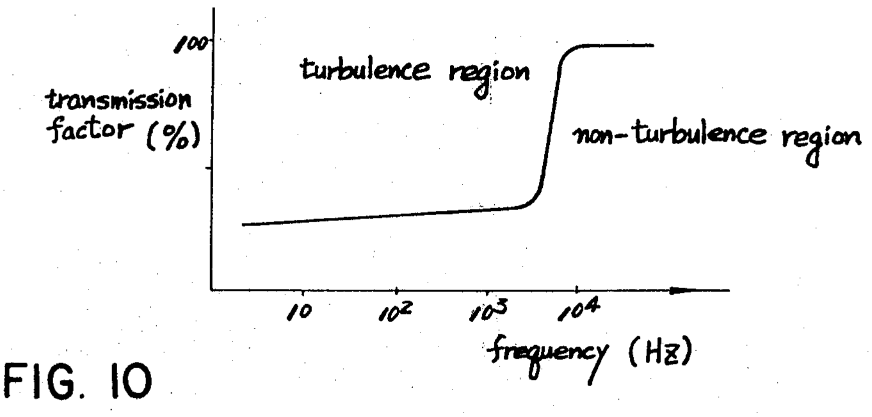
FIG. 10 is a graph showing characteristics of a liquid crystal.

FIG. 10 is a graph showing the transmission factor versus the frequency of signals applied to the liquid crystal. In practical use, the frequency of circulating the information is the information register is chosen about 100 KHZ for use in electronic calculators implemented with MOS-IC. In the case where it is converted into the frequency of the information, which becomes about 10–30 KHz on the average (the maximum 50 KHz). These values are effective to maintain the liquid crystal at the non-turbulence state.

In this manner inhibitation of display during the information introduction period is achieved by application of the voltage having such high frequency. In the case where the information register is implemented with bipolar transistors, higher frequency is obtainable. It is desirable that all the frequencies of the recirculating information are chosen to be within a range of the non-turbulence frequency, but it is still effective that a portion of the information frequencies falls off from the non-turbulence frequency range.

The display period is determined by the pulse width of the timing signals and, as mentioned previously, the frequency of signals corresponding to one cycle of the timing signals to the common electrodes should be the turbulence frequency. Nevertheless, there is a tendency of flickering on the display panel if the frequency is too low. The inventor's experiments reveal that the turbulence frequency should not be below 25 Hz.

Although in the foregoing example the contents of the n-digit information register are led out digit by digit and introduced into the buffer register and the liquid crystal is repeatedly turned to the turbulence state at a duty cycle of 1/n, the liquid crystal is activated at a duty cycle of 2/n with the use of a buffer register of a two-digit capacity. Furthermore, application of the alternating voltage provides improvements in life of the liquid crystal.

It should be noted that the subscript "*n*" in the designations $D_1$-Dn, $A_1$-An and $K_1$-Kn in the foregoing specification and drawings does not necessarily specify the same number.

We claim:

1. A display system comprising an information register for storing multi-digit information to be displayed, a plurality of liquid crystal display units each having a first optical state and a second optical state, said plurality of liquid crystal display units providing a visual indication of the multi-digit information at their first optical states, and means for applying to the liquid crystals signals of a high frequency sufficient to turn the liquid crystal units to their second optical states to erase said visual indication when said information is initially transmitted to the liquid crystal units.

2. A display system comprising an information register for storing multi-digit information to be displayed, a buffer register for accepting the information stored in the information register, a plurality of liquid crystal display units for displaying the multidigit information stored in the buffer register at their turbulence states, and means for applying to the liquid crystals signals of a high frequency sufficient to turn the liquid crystal units to their non-turbulence states only for the period of times where the information stored in the information register is introduced into the buffer register.

3. A display system comprising an information register for storing multi-digit information to be displayed, a buffer register for accepting the information stored in the information register, a generator for generating a train of sequential timing signals, a plurality of liquid crystal display units for displaying the multidigit information stored in the buffer register at their turbulence states, each of the liquid crystal display units having a common electrode, a plurality of segment electrodes and a liquid crystal composition between the common and segment electrodes, a first selection circuit associated with the timing signal generator and the common electrodes of the liquid crystal units for selecting sequentially the common electrodes of the liquid crystal units in synchronization with the timing signals, a second selection circuit associated with the buffer register and the segment electrodes of the liquid crystal units for selecting the segment electrodes in accordance with the contents of the buffer register, and an additional circuit for applying across the common electrode and the segment electrodes of the liquid crystal units signals of a high frequency sufficient to turn the liquid crystal units to their non-turbulence states only for the period of time where the information stored in the information register is introduced into the buffer register.

4. A display system as defined in claim 3 wherein each signal to the common electrodes has a low frequency not capable of turning the liquid crystal unit to the non-turbulence state while each signal to the segment electrodes has the non-turbulence frequency.

5. A display system as defined in claim 4 whrein the common electrodes are held at an intermediate level of the levels of the information stored in the information register during the period where the information is intorduced into the buffer register.

6. A display system as defined in claim 3 wherein both the signals to the common electrode and the segment electrodes are of alternating voltage amplitude.

7. A display system as defined in claim 3 wherein the first and second selection circuits comprise amplitude converter circuits respectively.

8. A display system as defined in claim 7 wherein the amplitude converter circuit includes at least one pair of transistors capable of functioning as an emitter follower.

9. A display system for displaying multidigit information on a time-sharing basis through the use of a series of liquid crystal display units each having a common electrode and a plurality of segment electrodes and a liquid crystal composition between the common electrode and the segment electrodes, comprising:

an information storage register storing multi-digit information to be displayed;

a buffer circuit interposed between said information storage register and said common electrodes of said liquid crystal units for receiving the multi-digit information from said information storage register;

means modifying the contents of said buffer circuit at a selected frequency sufficient to turn off said liquid crystal display units during the period of time wherein the information is transmitted from said information storage register to said buffer circuit;

and erasing means synchronized with said buffer circuit and connected with said common electrodes of said liquid crystal unit during said information transmission period simultaneously biasing said common electrodes during said time period so that all said liquid crystal display units are turned off simultaneously at least during said time period when said information is transmitted from said storage register to said buffer circuit by said selected frequency of modification of the contents of said buffer register.

* * * * *